(12) United States Patent
Hanoch et al.

(10) Patent No.: US 6,993,720 B1
(45) Date of Patent: Jan. 31, 2006

(54) APPARATUS AND METHOD FOR INTEGRATED SOFTWARE DOCUMENTATION

(75) Inventors: Craig Hanoch, Highland Park, NJ (US); Brett Fielo, Whitehouse Station, NJ (US); Joseph Anstatt, Chester, NJ (US)

(73) Assignee: CNET Networks, Inc., San Francisco, CA (US)

( * ) Notice: Subject to any disclaimer, the term of this patent is extended or adjusted under 35 U.S.C. 154(b) by 0 days.

(21) Appl. No.: 09/569,073

(22) Filed: May 11, 2000

Related U.S. Application Data

(60) Provisional application No. 60/134,080, filed on May 14, 1999.

(51) Int. Cl.
  *G06F 3/00* (2006.01)
(52) U.S. Cl. .................... 715/708; 715/781; 715/804; 715/705; 717/140
(58) Field of Classification Search ................ 345/705, 345/708, 714, 781, 788, 804, 805; 434/118; 709/313, 315, 328, 329
  See application file for complete search history.

(56) References Cited

U.S. PATENT DOCUMENTS

| | | | |
|---|---|---|---|
| 5,157,768 A * | 10/1992 | Hoeber et al. ............ 345/711 |
| 5,483,632 A * | 1/1996 | Kuwamoto et al. ......... 715/708 |
| 5,535,422 A * | 7/1996 | Chiang et al. .............. 345/709 |
| 5,546,521 A * | 8/1996 | Martinez ..................... 345/711 |
| 5,581,684 A * | 12/1996 | Dudzik et al. .............. 345/708 |
| 5,715,415 A * | 2/1998 | Dazey et al. ................ 345/708 |
| 5,729,704 A * | 3/1998 | Stone et al. ................. 345/804 |
| 5,774,118 A * | 6/1998 | Hatakama ................... 345/707 |
| 6,020,886 A * | 2/2000 | Jacober et al. ............. 345/709 |
| 6,091,930 A * | 7/2000 | Mortimer et al. .......... 434/362 |
| 6,219,047 B1 * | 4/2001 | Bell ........................... 715/705 |
| 6,259,445 B1 * | 7/2001 | Hennum et al. ........... 345/709 |
| 6,297,822 B1 * | 10/2001 | Feldman ..................... 345/705 |
| 6,300,950 B1 * | 10/2001 | Clark et al. ................. 345/705 |
| 6,442,370 B1 * | 8/2002 | Driscoll et al. ............ 434/350 |
| 6,456,303 B1 * | 9/2002 | Walden et al. ............. 345/705 |
| 6,496,208 B1 * | 12/2002 | Bernhardt et al. ......... 345/853 |
| 6,542,163 B2 * | 4/2003 | Gorbet et al. .............. 345/711 |

\* cited by examiner

*Primary Examiner*—X. L. Bautista
(74) *Attorney, Agent, or Firm*—Marc S. Kaufman; Nixon Peabody, LLP

(57) ABSTRACT

A method executed by a computer under the control of a program includes the step of linking an application program module with a corresponding integrated documentation module. A single window displays an application program module region and an integrated documentation module region in such a manner that the application program module region can be fully viewed. The application program module is compiled without compiling the integrated documentation module. The integrated documentation module region may be turned-off and the application program module region may be re-sized to substantially fill the single window.

13 Claims, 4 Drawing Sheets

APPARATUS AND METHOD FOR INTEGRATED SOFTWARE DOCUMENTATION

This application claims priority to the U.S. Provisional Patent application Ser. No. 60/134,080, filed May 14, 1999.

BRIEF DESCRIPTION OF THE INVENTION

This invention relates generally to software help systems. More particularly, this invention relates to a software help system that supplies application program information and integrated documentation information in a single, non-overlapping display.

BACKGROUND OF THE INVENTION

FIG. 1 illustrates a computer graphical user interface 20, which displays an application program 22. In the event that a computer user needs assistance when executing the application program 22, a help button 23 is activated with a mouse, which results in the presentation of a help window 24. Observe that the help window 24 obstructs the application program 22. Since the application program 22 is obstructed, the user must remember the task that is being performed. Typically, the layout and design of the help system differs from that of the underlying application program 22, which may augment a user's confusion and frustration.

Another problem with the system of FIG. 1 is that the help window 24 include's a navigation bar 26. The navigation bar 26 includes contents and index buttons, forcing the user to spend valuable time and energy navigating the help system. Also observe in FIG. 1 that text 28 is used to create context describing a problem and solution. This leads to long and confusing instructions.

The system of FIG. 1 is the widely known "WinHelp" system adopted by Microsoft Corporation, Redmond, Wash. Based on Rich Text Format (RTF), WinHelp systems blend an online manual with context-sensitivity. Users typically navigate WinHelp systems from a contents or index section, such as shown with the navigation bar 26. The WinHelp systems require a relatively high level of user interaction, thus valuable attention and energy is diverted from real work towards the task of navigating and understanding the help system.

Derivative systems based upon the WinHelp paradigm, such as Java-based help systems, have been implemented. Such systems blend Hypertext Markup Language (HTML) with the Java programming language from Sun Microsystems, Mountain View, Calif. Such systems are labor-intensive for both the programmer and the user.

Standard Generalized Markup Language (SGML) raises the promise of a complete documentation solution that is portable to any environment. Unfortunately, publishing online help in SGML is labor intensive and the resulting system has many of the same deficiencies as the WinHelp system.

Embedded help systems add the content of the help files to the application interface by compiling the help system with the application. Help content may be presented in a section of the interface. The problem with these embedded solutions is that they require proprietary tools or compilers and they must be compiled with the application.

In view of the foregoing, it would be highly desirable to provide an improved technique for supplying help information to the user of an application program.

SUMMARY OF THE INVENTION

The method of the invention is executed by a computer under the control of a program. The method includes the step of linking an application program module with a corresponding integrated documentation module. A single window displays an application program module region and an integrated documentation module region in such a manner that the application program module region can be fully viewed. The application program module is compiled without compiling the integrated documentation module. The integrated documentation module region may be turned-off and the application program module region may be re-sized to substantially fill the single window.

The apparatus of the invention is a computer readable memory to direct a computer to function in a specified manner. The apparatus includes a first set of instructions to link an application program module with a corresponding integrated documentation module. A second set of instructions is used to display a single window with an application program module region and an integrated documentation module region. The integrated documentation module region is displayed to facilitate full viewing of the application program module region.

The integration of the application program and the software documentation in a single window guarantees a clear connection between the help information and the application. This single window approach allows the context to be created by the application itself, instead of a prose description of the context. The nexus between the application program and the help information enhances the understanding of the application program. Another advantage of the technique of the invention is that the user knows that the help page presented for a specific routine is the sole content for that routine. Thus, the user need not hunt through a long index of possible entries to find a help file which may or may not exist.

The integrated documentation and the application program of the invention are separate and therefore they do not have to be compiled together. Thus, the system does not substantively impact performance, as is in the case of an embedded help system that needs to be compiled. Since the integrated documentation is separate from the application program, changes can be made to the integrated documentation without effecting the application program and vice versa.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
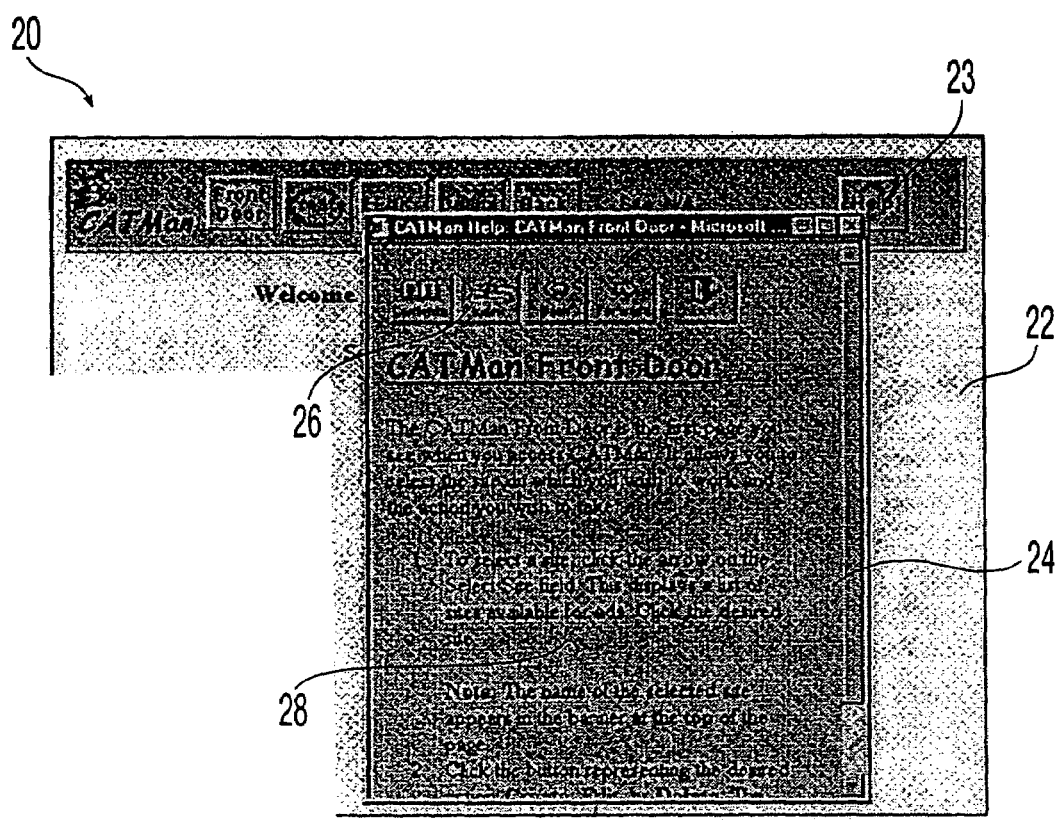
FIG. 1 illustrates a prior art software help system.
Figure 2:
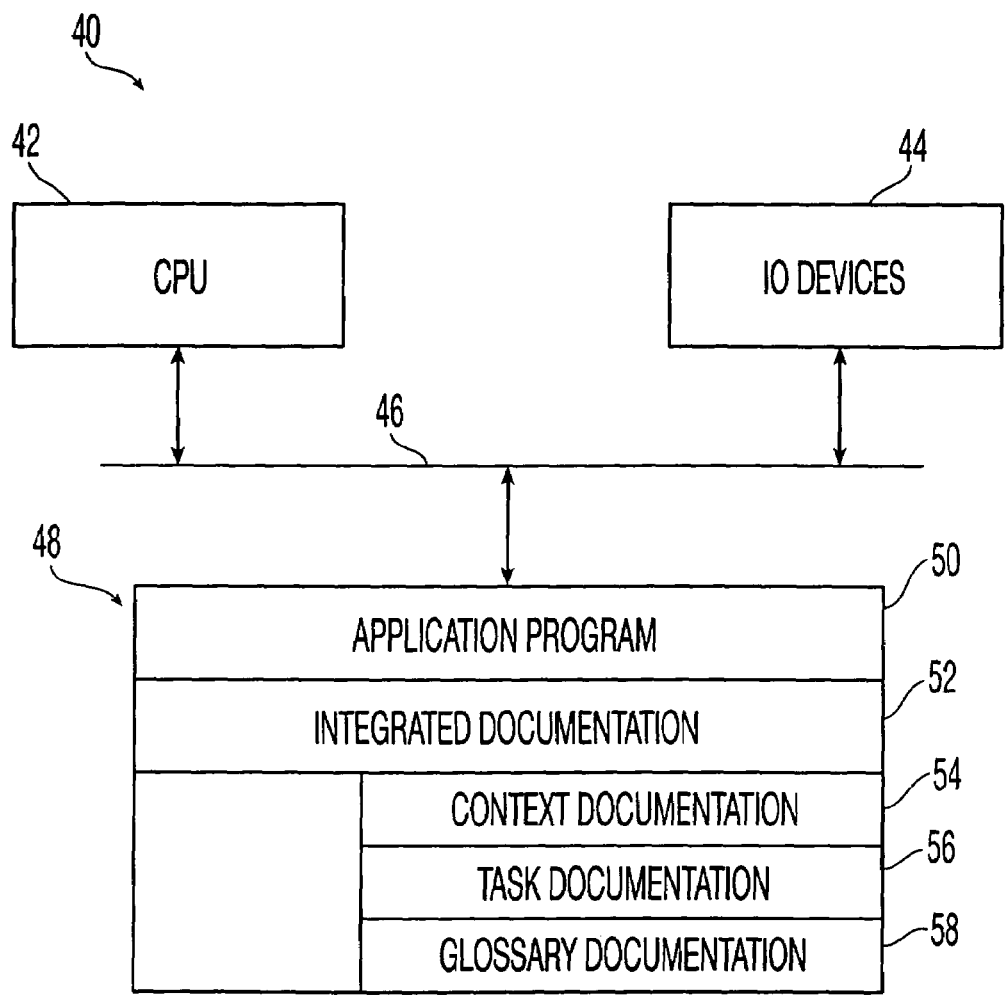
FIG. 2 illustrates an apparatus constructed in accordance with an embodiment of the invention.

FIG. 2 illustrates a computer 40 constructed in accordance with an embodiment of the invention. The computer 40 includes a central processing unit 42 and a set of input/output devices (e.g., keyboard, mouse, video monitor, printer) 44 connected via a system bus 46. A memory 48 is also connected to the system bus 46. The operation of a central processing unit 42, a set of input/output devices 44, a system bus 46, and a memory 48 are well known in the art. The invention is directed toward the set of programs stored in the memory 48. The memory 48 includes an application program 50, which may be any type of application program, such as a word processor, a spreadsheet, a database, and the like. In accordance with the invention, integrated documentation 52 for the application program 50 is provided. The integrated documentation 52 includes individual integrated documentation modules. By way of example, FIG. 3 illustrates the following integrated documentation modules: a context documentation module 54, a task documentation module 56, and a glossary documentation module 58.

Figure 3:
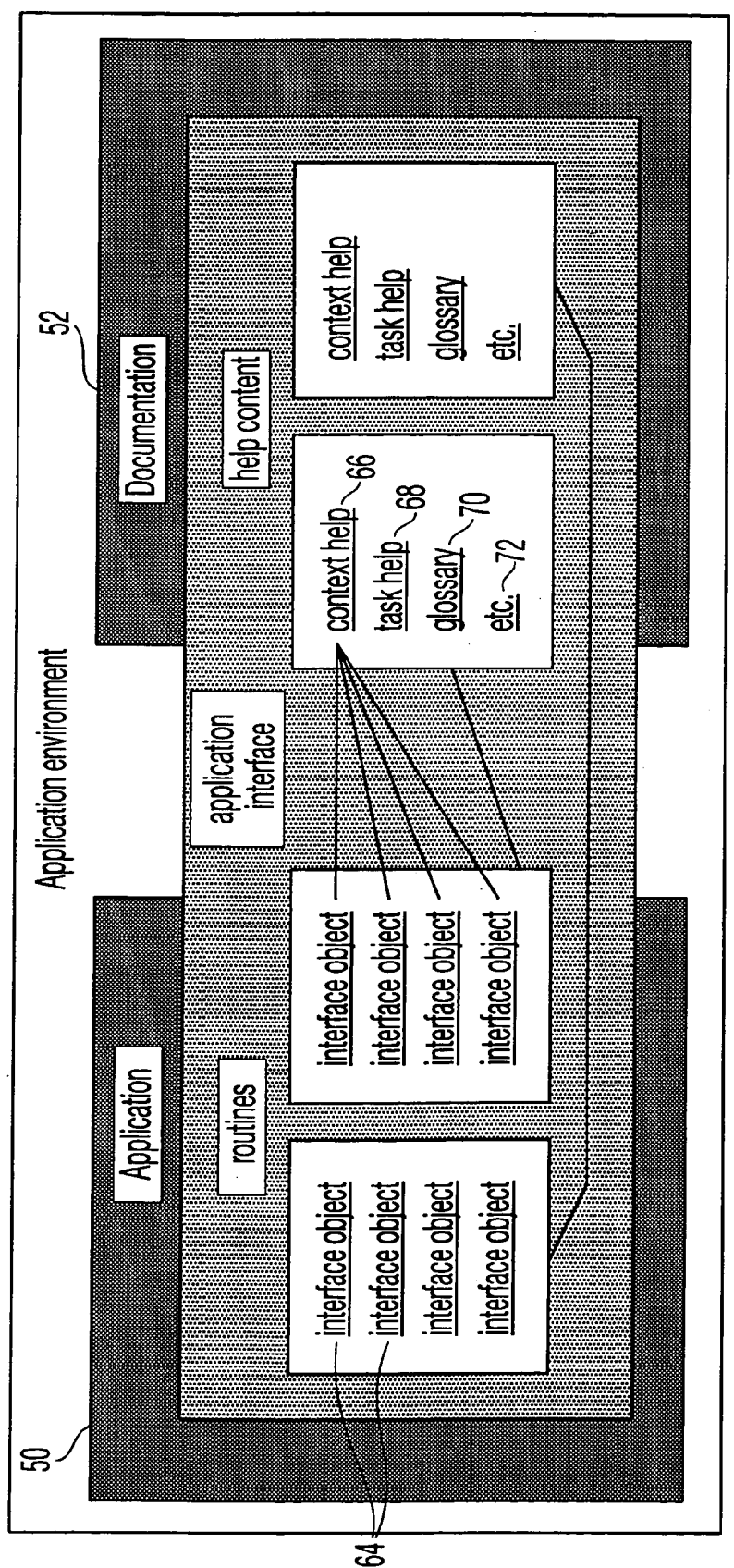
FIG. 3 illustrates the relationship between an application program and integrated documentation utilized in accordance with an embodiment of the invention.

The relationship between the application program 50 and its corresponding integrated documentation 52 is disclosed in connection with FIG. 3. FIG. 3 generally illustrates an application program 50 which includes a set of application program modules or interface objects 64. Each application program module 64 has a link to a corresponding integrated documentation module of the integrated documentation 52. In the example of FIG. 3, the integrated documentation 52 includes a context help module 66, a task help module 68, a glossary module 70, and a miscellaneous information module 72.

Observe that the application program is separate from the integrated documentation. This allows changes to be made to the integrated documentation without effecting the application program and vice versa.

The integrated documentation module referred to as the context help module 66 provides context information about the operation of an associated application program module 64. The task help module 68 provides task help information about the execution of an associated application program module 64. The glossary module 70 provides definitions for terms used in an associated application program module 64. The miscellaneous information module 72 may include documentation, such as indices, print-friendly manuals, and related resources.

Figure 4:
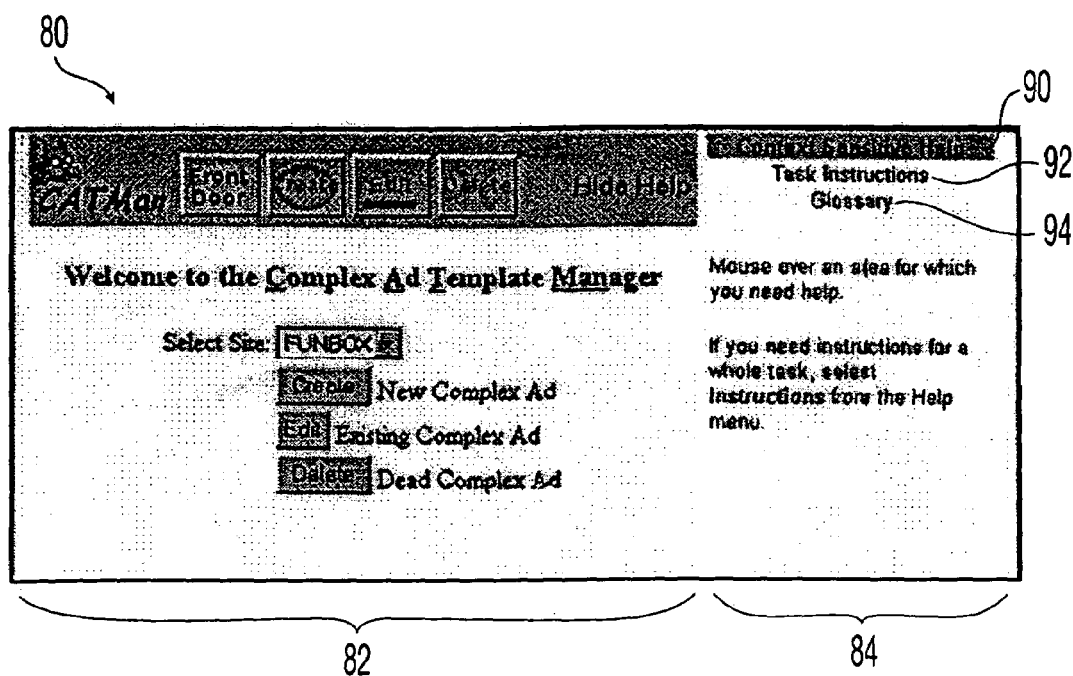
FIG. 4 illustrates a single window with an application program module region and an integrated documentation module region in accordance with an embodiment of the invention.

After an application program module 64 is linked with its corresponding integrated documentation module (e.g., 66, 68, 70) a single, non-overlapping window is used to display the application program and integrated documentation. This feature of the invention is shown in FIG. 4. FIG. 4 illustrates an application program module region 82 and an integrated documentation module region 84. The application program module region 82 displays the information from a corresponding application program module, while the integrated documentation module region 84 displays the information from a corresponding integrated documentation module.

Observe in FIG. 4 that the help system (i.e., the integrated documentation module region 84) runs alongside the application program (i.e., the application program module region 82). Since the help system is presented in this manner, it is referred to as integrated documentation. As indicated above, the integrated documentation is not compiled with the application program and therefore should not be viewed as integrated with the application program from a compilation standpoint.

The configuration of FIG. 4 facilitates work in the application program and learning about the application program. This configuration also results in the application program creating the context for the help to be provided. This allows for short, clear instructions that do not include context information or information describing how to use the help system. Accordingly, the system allows the user to focus on the task of learning the application, instead of learning how the help system works.

Also observe in FIG. 4 that the integrated documentation module region 84 includes links 90, 92, and 94 to select a context documentation module 54, a task documentation module 56, or a glossary documentation module 58 for the given application program module displayed in the application program module region 82. Thus, users can toggle between different types of help information with the assurance that they are still reading the appropriate content for the routine or task. They are also assured that they are receiving all of the help information for the routine or task.

The integrated documentation 52 is separate from the application program source code 50. This allows the application developer and the help system developer freedom to enhance or edit their work without adversely affecting the performance of the overall application.

The linking of application program modules and integrated documentation modules may be accomplished by monitoring a computer user's selections (i.e., mouse events). Thus, when a computer user selects a particular application program module, the corresponding integrated documentation module is displayed, as shown in FIG. 4.

The integrated documentation module region may be turned-off so that the application program module region is re-sized to fill the single display window. The on/off state of the integrated documentation may be implemented as follows. A link or menu element may include a variable for the state of the help system and a text or menu control to reset the variable. This state may be constructed so as to preserve the previous state of the system, for example via a system variable or persistent client side state information (i.e., a "cookie"). A Dynamic Hypertext Mark-up Language (DHTML) implementation of the on/off transitioning follows.

```
//The switch is activated by an "on mouse click event"; that is,
//the switch is activated by the clicking of a mouse cursor on
//the "HelpToggle" button. The following code identifies this
//event.
if (window.event.srcElement.id = = "HelpToggle")
//The following code sets two states for the help system, 1
//for "on" or 0 for "off"
    {
        objTable = document.all ("MainTable");
        if (G_bShowHelpPane = = 1)
        {
            G_bShowHelpPane = 0;
document.all("HelpToggle").innerText= "ShowHelp";
//The following code creates the text for the page to display
//when help is off.
document.all ("HelpModes").style.display= "none";
document.all("HelpItemArea").style.display = "none";
//The following code sets the actual help system to hide when the
//off switch is selected. This results in the application program
//module region assuming 100% of the window or viewing area.
document.all("ContentArea").width = "100%";
        }
        else
        {
            G_bShowHelpPane = 1;
document.all ("HelpToggle").innerText "HideHelp";
```

-continued

```
//The following code creates the text for the page to display
//when the help feature is on. The code sets the window's
//dimensions; in this case, 70% for the application program
//module region and 30% for the integrated documentation module
//region.
document.all ("HelpModes").style.display= " " ;
document.all("HelpItemArea").style.display= " " ;
document.all ("ContentArea").width= "70%";
        document.all("HelpArea").width= "30%";
}
```

The implementation of an embodiment of the on and off states of the invention has now been described. Attention now turns to the implementation of the processing for an embodiment of the context help integrated documentation module of the invention. The context-sensitive help is responsive to an activated event in the main application window. The handler parses the event's identification into a new variable which corresponds to an object in the help system. In other words, an application program module is linked with a corresponding integrated documentation module. The application program module may be considered the activated event in the application program or its corresponding variable. Once the correct variable for the event is identified, the information from the integrated documentation module is displayed in the integrated documentation module region. The following code is an example of a code event handler to implement this functionality. The code for the application and help system may be standard HTML or Java and need only include the appropriate identifications and classes referenced by the event handler, as noted in the following code documentation.

```
// This event handler provides context-sensitive help.
//The className HotField denotes that an item in the application
//with this generic className should be handled.
function doRollOver ( )
    {
    if (window.event.srcElement.className = = "HotField")
//The following code creates a new ID and sets the
//display for the corresponding object to show.
    {
        document.all (window.event.srcElement.id
+ "Help").style.display= " ";
//The following code hides the default help content that displays
//when the system starts.
document.all ("textDefaultHelp").style.display
= "none";
    }
    }
// The following code reverses the process and restores the
//default content.
function doRollOff ( )
    {
    if (window.event.srcElement.className = =
"HotField")
        {
            document.all (window.event.srcElement.id
+ "Help") .style.display = "none";
                document.all
("textDefaultHelp").style.display = " " ;
        }
    }
```

Task documentation 56 is provided for each routine or form in the application by an event handler that switches the mode from the default mode (context-sensitivity) and calls in the proper file for the routine. The following code may be used to implement this feature. (Note that in the DHTML version, the actual content for the routine is called by a virtual include, while in a Java version a standard file call mechanism is used).

```
//The following code calls an array of help modes and sets a loop.
{for(var i = 0; i <a.length; i++)
//The following code hooks the user's selection of one of the
//three modes (context 54, task 56, or glossary 58).
        if (window.event.srcElement.id = = [a[i]])
//The next line of code extends the scope of the loop.
        {for(var i = 0; i <a.length; i++)
//The following code sets the style of the mode switch or menu
//items so that the user knows which mode is on.
document.all[a[i]].className =
"HelpTypeDeselected";
document.all[window.event.srcElement.id].class
Name = "HelpTypeSelected";
//The following code creates a new loop for the help content.
        {for(var j = 0; j <b.length; j++)
//The following code displays the selected mode's help content.
        document.all[b[j]].style.display = "none"
        document.all[window.event.srcElement.id +
"Area"].style.display = " " ;
        }
    }
```

The glossary documentation 58 is displayed in the same manner as the task documentation 56, as discussed above.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method executed by a computer under the control of a program, said computer including a memory for storing said program, said method comprising the steps of:

linking an application program module with a corresponding integrated documentation module, wherein said integrated documentation module provides information about said application program module;

compiling said application program module without compiling said integrated documentation module; and displaying a single window with an application program module region for displaying information associated with said application program module and an integrated documentation module region for displaying information associated with said integrated documentation module, the information associated with said integrated documentation module region being displayed so as to facilitate full viewing of the information associated with said application program module region.

2. The method of claim 1 further comprising the steps of:
turning off said integrated documentation module region; and
re-sizing said application program module region to substantially fill said single window.

3. The method of claim 1 wherein said displaying step includes the step of displaying, in said integrated documentation module region, context information defined in said integrated documentation module, said context information providing directions regarding the operation of said application program module.

4. The method of claim 1 wherein said displaying step includes the step of displaying, in said integrated documentation module region, task help information defined in said integrated documentation module, said task help information providing directions regarding the execution of said application program module.

5. The method of claim 1 wherein said displaying step includes the step of displaying in said integrated documentation modules region glossary information that is defined in said integrated documentation module, said glossary information comprising definitions of terms used in said application program module.

6. The display device of claim 1, wherein the integrated documentation module displays images that include information to assist in the execution of the application program.

7. A computer readable memory to direct a computer to function in a specified manner, comprising:
a first set of instructions to link an application program module with a corresponding integrated documentation module, wherein said integrated documentation module provides information about said application program module and said application program module compiled without said integrated documentation module; and
a second set of instructions to display a single window with an application program module region for displaying information associated with said application program module and an integrated documentation module region for displaying information associated with said integrated documentation module, the information associated with said integrated documentation module region being displayed so as to facilitate full viewing of the information associated with said application program module region.

8. The apparatus of claim 7 further comprising:
a third set of instructions to turn off said integrated documentation module region; and
a fourth set of instructions to re-size said application program module region to substantially fill said single window.

9. The apparatus of claim 7 wherein said second set of instructions include directions regarding the operation of said application program module.

10. The apparatus of claim 7 wherein said second set of instructions include directions regarding the execution of said application program module.

11. The apparatus of claim 7 wherein said second set of instructions include glossary information comprising definitions of terms used in said application program module.

12. A display device comprising:
means for displaying images associated with an application program in a first window;
means for compiling and running an integrated documentation module associated with said application program, wherein said application program module is compiled without the integrated documentation module; and
means for displaying images associated with the integrated documentation module in the first window, wherein said images associated with the application program and the images associated with the integrated documentation module are sized and displayed so as to allow unobstructed viewing of the images associated with the application program.

13. The device of claim 12, further comprising:
means for removing images associated with said integrated documentation module region; and
means for re-sizing the images associated with the application program module to the size prior to the compiling and running an integrated documentation module.

* * * * *